(12) United States Patent
Saele (10) Patent No.: US 7,210,469 B1
(45) Date of Patent: May 1, 2007

(54) OXIDATION CATALYST COATING IN A HEAT EXCHANGER

(75) Inventor: Gregory J. Saele, Itasca, IL (US)

(73) Assignee: International Engine Intellectual Property Company, LLC, Warrenville, IL (US)

(*) Notice: Subject to any disclaimer, the term of this patent is extended or adjusted under 35 U.S.C. 154(b) by 17 days.

(21) Appl. No.: 11/293,935

(22) Filed: Dec. 5, 2005

Related U.S. Application Data

(63) Continuation-in-part of application No. 11/256,916, filed on Oct. 24, 2005.

(51) Int. Cl.
*F02M 25/07* (2006.01)
*F02B 47/08* (2006.01)
*F02B 33/44* (2006.01)

(52) U.S. Cl. ............................. 123/568.12; 60/605.2

(58) Field of Classification Search ................ 60/274, 60/278, 279, 320, 321, 605.2; 123/568.11, 123/568.12; 165/61, 66, 85, 103, 157, 162, 165/164, 165, 168, 177
See application file for complete search history.

(56) References Cited

U.S. PATENT DOCUMENTS

| | | | | |
|---|---|---|---|---|
| 4,852,642 A | * | 8/1989 | Lee | 165/109.1 |
| 5,785,030 A | * | 7/1998 | Paas | 60/278 |
| 6,193,942 B1 | | 2/2001 | Okuda et al. | |
| 6,202,402 B1 | * | 3/2001 | Sattelmayer | 60/39.511 |
| 6,591,818 B2 | * | 7/2003 | Sasaki et al. | 123/568.12 |
| 6,804,952 B2 | * | 10/2004 | Sasaki et al. | 60/284 |
| 6,826,903 B2 | * | 12/2004 | Yahata et al. | 60/278 |
| 6,849,352 B2 | * | 2/2005 | Formanski et al. | 429/17 |
| 6,880,535 B2 | * | 4/2005 | Sorter et al. | 123/528 |
| 2002/0040708 A1 | * | 4/2002 | Chmela et al. | 123/568.14 |
| 2003/0108465 A1 | | 6/2003 | Voss et al. | |
| 2004/0231328 A1 | * | 11/2004 | Reider et al. | 60/605.2 |
| 2005/0199381 A1 | * | 9/2005 | Mercz et al. | 165/172 |
| 2006/0075995 A1 | * | 4/2006 | Liu et al. | 123/568.12 |
| 2006/0124114 A1 | * | 6/2006 | Sayers et al. | 123/568.12 |
| 2006/0174611 A1 | * | 8/2006 | Dilley et al. | 60/320 |

FOREIGN PATENT DOCUMENTS

| | | | |
|---|---|---|---|
| EP | 0099658 | * | 2/1984 |
| JP | 62-45922 A | * | 2/1987 |
| JP | 2006078062 A | * | 3/2006 |

\* cited by examiner

*Primary Examiner*—Willis R. Wolfe, Jr.
(74) *Attorney, Agent, or Firm*—Elisa P. Soupos; Susan L. Lukasik; Jeffrey P. Calfa (57) ABSTRACT

A method for an internal combustion engine includes the steps of collecting exhaust gas in a volume (902) and flowing exhaust gas out of the volume in a first and a second portions (904). The first portion forms a tailpipe gas stream (906), and the second portion forms an EGR gas stream (908). The tailpipe gas stream goes through a turbine (910). The EGR gas stream is catalyzed by an oxidizer coating in a heat exchanger, and thermal energy is transferred from the EGR gas stream to the tailpipe stream in the heat exchanger (916).

20 Claims, 6 Drawing Sheets

SECTION A-A
FIG. 4

SECTION B-B

OXIDATION CATALYST COATING IN A HEAT EXCHANGER

CLAIM OF PRIORITY

This application is a continuation-in-part application of and claims the priority benefit of the filing date of Non-Provisional application Ser. No. 11/256,916 filed Oct. 24, 2005, on behalf of the same inventor as the present application and assigned to the assignee hereof.

FIELD OF THE INVENTION

This invention relates to internal combustion engines, including but not limited to engines having exhaust gas heat exchangers.

BACKGROUND OF THE INVENTION

Internal combustion engines generate heat during operation that is released into the environment through exhaust gas emissions. Modern emission controls systems may utilize energy, in the form of heat from the exhaust gas, to operate various components, for example, Diesel Particulate Filters (DPF). In other cases, heat may be undesirable and removed by use of other components and systems.

One example of a case where additional heat is desirable for the operation of an engine is the operation of a DPF, which depends on a reaction that occurs internally to the DPF and burns particulates that have accumulated therein. Some engines incorporate thermal shielding on their exhaust systems to contain exhaust heat and make it available for emissions components. Heat makes the regeneration of the DPF more efficient. One example of a case where removal of heat is required for proper operation of the engine is in an exhaust gas recirculation (EGR) system, which recirculates cooled exhaust gas into an intake of the engine. EGR systems typically use exhaust gas coolers to remove heat from an exhaust gas stream during recirculation.

Even though heat input may be desirable for some engine systems, heat removed from other systems that is typically rejected back to the engine is undesirable. Heat rejected and/or generated internally to the engine is removed from the engine by a cooling system. Typical cooling systems promote efficient operation of the engine and protect heat sensitive systems. Thermally conductive fluids, that include for instance oil or engine coolant, carry heat collected from within the engine and/or engine components to a radiator, which then expels the heat to the environment.

Exhaust gases from internal combustion engines can typically contain hydrocarbons (HC), Carbon Monoxide (CO), and particulate matter (PM). Oxidation catalysts, typically comprising a platinum group metal dispersed on a refractory metal oxide support are known for use in treating exhaust gases to remove these pollutants by catalyzing the oxidation of these pollutants to carbon dioxide and water.

In EGR systems, HC and PM can precipitate out of exhaust gases and collect on surfaces of EGR system components such as coolers, valves, and pipes, and on down stream systems, such as intake manifolds, intake ports, and intake valves. EGR Coolers may become "fouled" as a result and lose heat transfer effectiveness and flow area. EGR valves can become fouled with deposits and become inoperable or sluggish. Deposits in downstream systems can also change their intended characteristics, or performance. As such, reduction of HC and PM in the EGR system is desirable. Some EGR system designs, therefore, incorporate an oxidation catalyst upstream of the EGR cooler and valve, advantageously removing some of the HC and PM.

A disadvantage of this approach is that the catalytic oxidation of pollutants in the EGR exhaust stream releases heat. This additional heat load must be compensated for by the EGR cooler and vehicle radiator.

SUMMARY OF THE INVENTION

A method for an internal combustion engine includes the step of collecting exhaust gas in a volume. Exhaust gas flows out of the volume in a first portion and a second portion. The first portion forms a tailpipe gas stream and the second portion forms an exhaust gas recirculation (EGR) gas stream. The tailpipe gas stream passes through a turbine. The EGR gas stream is catalyzed by an oxidation catalyst coating in a heat exchanger, and thermal energy is transferred from the EGR gas stream to the tailpipe stream in the heat exchanger.

An apparatus includes an engine having an intake manifold and an exhaust manifold. A turbine is in fluid communication with the exhaust manifold. A heat exchanger has a hot gas inlet, a cold gas inlet, a warm gas outlet, and a cooled gas outlet. An oxidation catalyst material layer is coated on an internal surface of the heat exchanger. The hot gas inlet is in direct fluid communication with the exhaust manifold and the cooled gas outlet. The cold gas inlet is in direct fluid communication with the turbine and the warm gas outlet, and the coated internal surface of the heat exchanger is in fluid communication with the cooled gas outlet and the intake manifold.

An air-to-air heat exchanger includes an inner tube and an outer tube placed around the inner tube. The inner tube and the outer tube are concentric. A plurality of tabs is connected between the inner tube and the outer tube. An oxidation catalyst material layer lies between the inner tube and the outer tube. A first gas stream flows in a first direction in an inner volume of the inner tube, and a second gas stream flows in a second direction in a volume formed between the inner tube and the outer tube.

DESCRIPTION OF A PREFERRED EMBODIMENT

Figure 1:
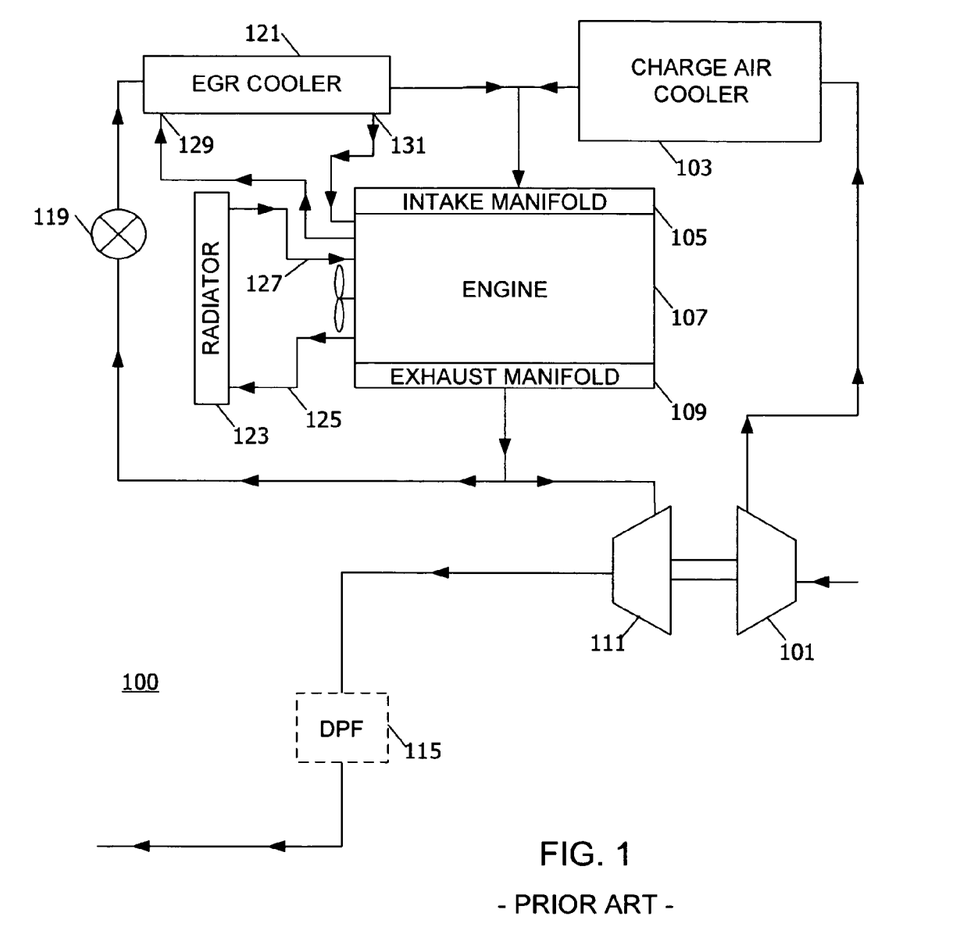
FIG. 1 is a block diagram of a typical engine.

The following describes an apparatus for and method of reducing undesirable heat load for a cooling system of an internal combustion engine. A typical turbocharged diesel engine system 100 having cooled EGR is shown in FIG. 1. Fresh air enters a compressor 101 of an engine 107. An outlet of the compressor 101 is connected to a charge air cooler 103. An outlet of the charge air cooler 103 is connected to an intake manifold 105 of an engine 107. Compressed air enters a combustion chamber through the intake manifold 105 of the engine 107, where it is mixed with fuel. The mixture of air and fuel is compressed in the combustion chamber and combusts releasing work and heat. Heat released from the combustion of fuel and air is removed from the engine 107 in two ways. First, fluids such as oil and/or water-based coolants are circulated through the engine 107, in direct contact with engine components.

As engine components heat up, fluid circulating through the engine 107 is heated by conduction and/or convection. The heated fluid carries with it heat removed from the engine components. The heated fluid is taken to a radiator 123 through a radiator coolant supply passage 125. Heat is released to the environment by the radiator 123, and cooled fluid returns to the engine 107 through a radiator coolant return passage 127. In addition to the radiator 123, a second avenue for releasing heat from the engine is heat that is carried away from the engine 107 by exhaust gas exiting the engine 107 when combustion is complete, through an exhaust manifold 109.

A portion of the exhaust gas in the exhaust manifold 109 is recirculated into the intake manifold 105 of the engine 107 by passing through an EGR valve 119 and an EGR cooler 121. The EGR cooler 121 typically is an air-to-water cooler. Coolant from the engine 107 may enter the EGR cooler 121 through a coolant feed passage 129. Coolant from the coolant feed passage 129 passes through the cooler and collects heat from exhaust gas passing through the cooler that comes from the exhaust manifold 109. The exhaust gas is cooled and the coolant is heated. Heated coolant returns to the engine 107 through a coolant return passage 131. The coolant entering the engine 107 through the return passage 131 mixes with warm coolant coming from internal components of the engine 107, and is eventually routed to the radiator 123 where heat from the engine 107 and the EGR cooler 121 is expelled to the environment.

Another portion of the exhaust gas from the exhaust manifold 109 is routed to a turbine 111. The turbine 111 converts a portion of the heat and pressure of the exhaust gas into work to operate the compressor 101, and exhaust gas at a lower temperature and pressure is expelled from the turbine 111 to the environment, or alternatively into after-treatment components, for example, a DPF 115.

The DPF 115 collects combustion byproducts from the exhaust gas and intermittently burns the byproducts through a process called regeneration. The efficiency of the regeneration process depends on the heat input to the DPF 115 from the exhaust gas. Increased thermal energy passing through the DPF 115 may lead to more efficient regeneration.

One disadvantage of the system shown in FIG. 1 is sub-optimal use of heat or thermal energy. Heat removed from the recirculated exhaust gas in the EGR cooler 121 is transferred to the engine cooling system and is subsequently released to the environment thus increasing a thermal load requirement for the cooling system. The system shown in FIG. 2 solves this and other problems.

Figure 2:
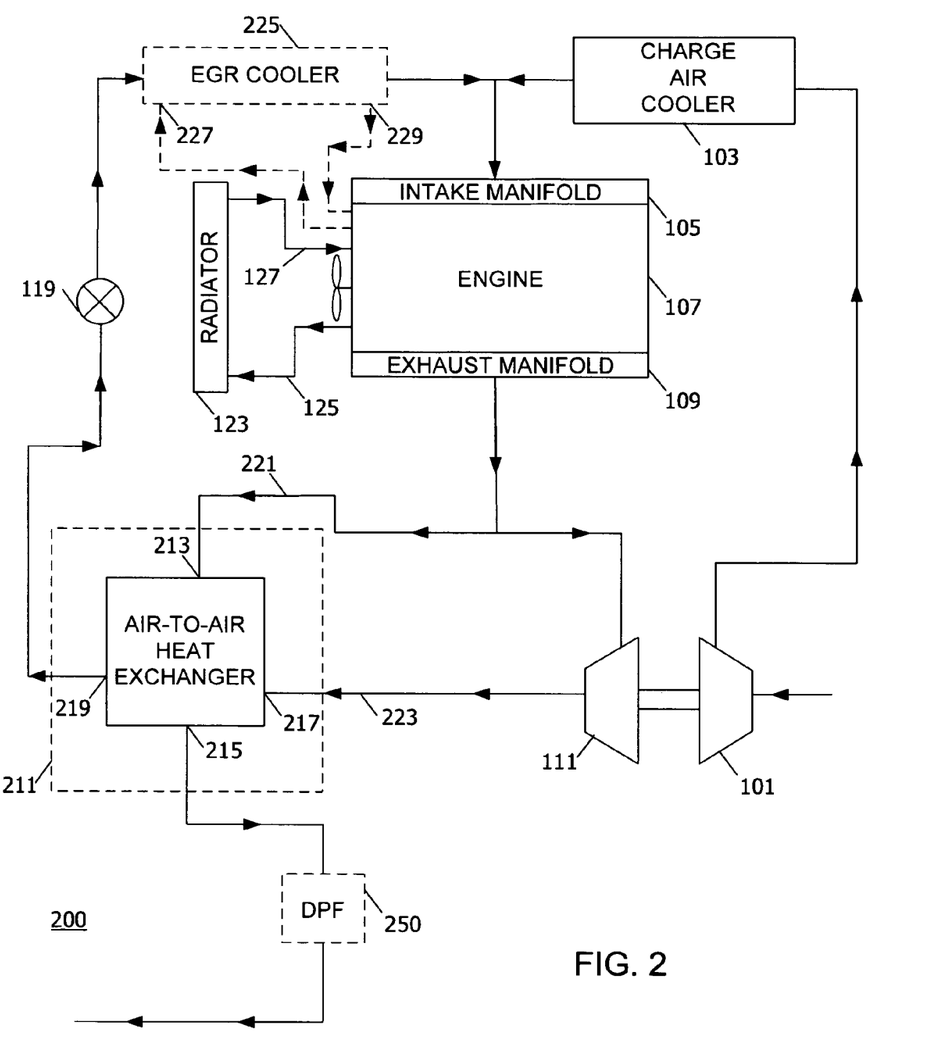
FIG. 2 is a block diagram of an engine having an air-to-air heat exchanger in accordance with the invention.

An engine system 200 includes many common components as the engine system 100 shown in FIG. 1, with the exception of a heat exchanger 211. The common components are not described in detail for the sake of brevity. The heat exchanger 211 has a hot gas inlet 213, a warm gas outlet 215, a cold gas inlet 217, and a cooled gas outlet 219. The cold gas inlet 217 is fluidly connected to the warm gas outlet 215 to form a tailpipe gas stream 223, and the hot gas inlet 213 is fluidly connected to the cooled gas outlet 219 to form an EGR exhaust gas stream 221. Exhaust gas from the exhaust manifold 109 enters the heat exchanger 211 from the hot gas inlet 213, and exits through the cooled gas outlet 219. Exhaust gas from the exhaust manifold 109 also enters the turbine 111.

Exhaust gas exiting the turbine 111 enters the heat exchanger 211 from the cold gas inlet 217, and exits from the warm gas outlet 215 from where it is expelled to the environment. If after-treatment components are present, for example a DPF 250, or other components, the exhaust gas from the warm gas outlet 215 may pass through those components before being expelled to the environment. A temperature difference that exists between the EGR gas stream 221 and the tailpipe exhaust gas stream 223, before the two streams 221 and 223 enter the heat exchanger 211, causes heat to be transferred from the EGR gas stream 211 to the tailpipe gas stream 223 in the heat exchanger 211. The heat exchanger 211 effectively cools the EGR gas stream 221 and warms up the tailpipe gas stream 223.

Heat transfer occurring in the heat exchanger 211 is advantageous. A desired amount of heat removed from the EGR stream 221 may be determined by consideration of various factors, for example, the emissions requirements of the engine 107, or the use and capacity of an optional air to water EGR cooler 221. With a cooling effect applied to the EGR exhaust gas stream 221 in the heat exchanger 211, use of the air to water EGR cooler 225 and all design, manufacturing and development costs associated therewith may advantageously be avoided. A decision whether the optional air to water EGR cooler 225 is required may be determined by the ability to achieve a desired temperature of recirculated exhaust gas being recirculated. Regardless of use of the cooler 225, the ability to remove heat from the EGR stream 221, and to add heat to the tailpipe gas stream 223, can be advantageous.

First, the heat removed from the EGR gas stream 221 would have otherwise been expelled to the environment by being transferred to a cooling system and expelled through a radiator. With an implementation of the air-to-air heat exchanger 211 the heat removed from the EGR gas stream 221 is conserved and can be used for optimization of the operation of after-treatment components like the DPF 115. Second, there is a reduced heat transfer requirement on the EGR cooler 225, when used, because heat is removed from the EGR gas stream 221 upstream of the cooler 225. This reduced heat transfer requirement allows for use of a smaller and less costly EGR cooler 121. The reduced heat load on the EGR cooler 225 is also advantageous for the cooling system of the engine 107 because the size and cost of a vehicle's radiator may be reduced, and various attributes of the cooling system, such as a coolant pump (not shown) and passages, including the passages 125 and 127, may be downsized. Moreover, additional reductions of fan size and frequency of fan engagement may be implemented that may improve fuel economy by reducing parasitic losses.

Use of the EGR cooler 225 is optional. A coolant supply passage 227 and a coolant return passage 229 for the cooler 225 are also optional. If efficiency of the heat exchanger 211 is adequate to meet emissions requirements of the engine, there may be no need for a secondary cooler such as the air-to-water EGR cooler 225. Moreover, the heat exchanger 211 may be implemented in a different engine configuration that includes more than one turbine or compressor (not shown).

Figures 3, 4:
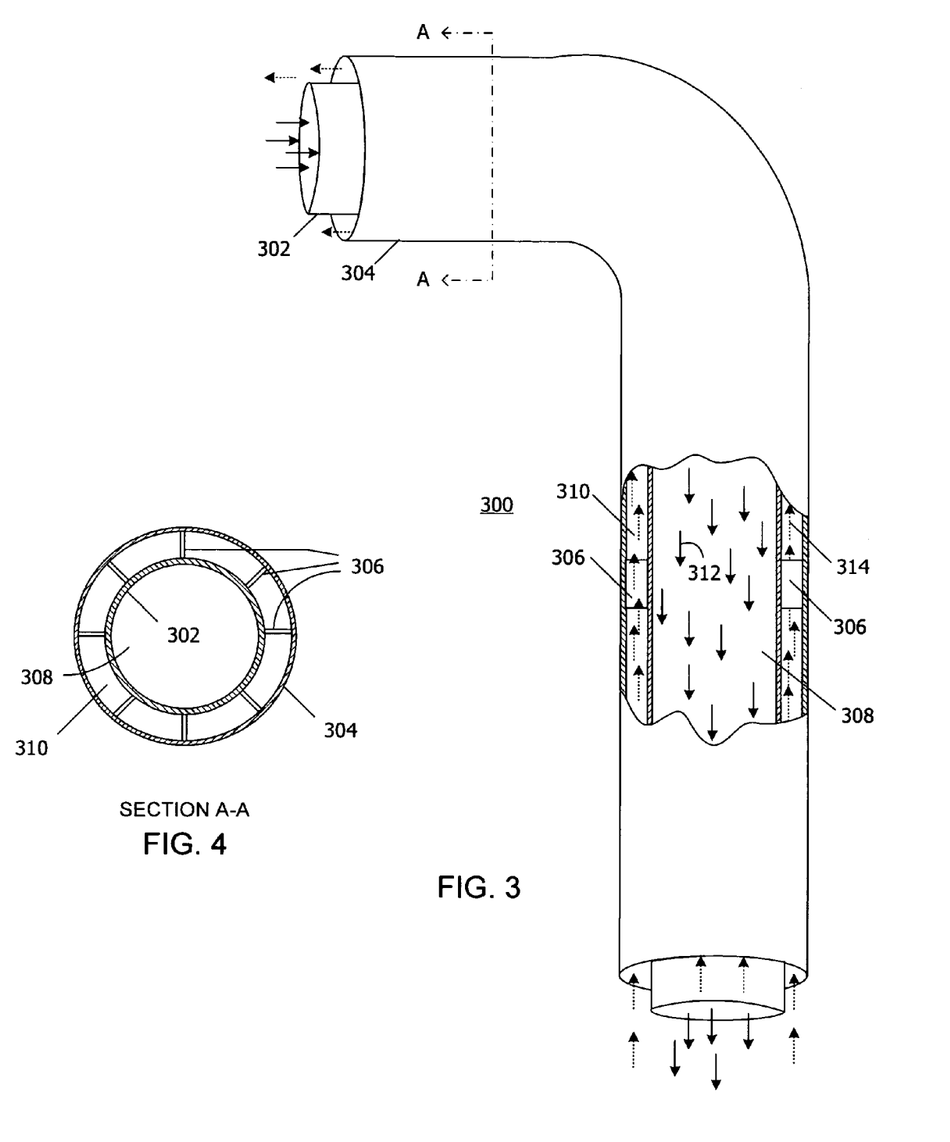
FIG. 3 is a perspective view of a section of an air-to-air heat exchanger that includes two concentric tubes in accordance with the invention.
FIG. 4 is a section view of the air-to-air heat exchanger of FIG. 3.

One possible implementation for an air-to-air heat exchanger 300 is shown in FIG. 3. The air-to-air heat exchanger 300 is configured to operate as a tube that is part of an exhaust system of an engine installed in a vehicle. The heat exchanger 300 may advantageously be positioned in a vehicle downstream of a turbine, as shown in the embodiment of FIG. 2, and form part of what is known in the art as a "down-pipe", denoting a tube connecting an outlet of a turbine with after-treatment and/or exhaust and/or a tailpipe of a vehicle.

The heat exchanger 300 includes an inner tube 302 contained in an outer tube 304. The tubes 302 and 304 may be concentric and may be thin walled steel tubes. The tubes may be connected with a plurality of tabs 306. One such tab 306 is shown in a partial cut-away section A—A, shown in FIG. 4. Each tab 306 may be cold-welded in position between the tubes 302 and 304, or may alternatively be fabricated between two plates that are formed into a tubular shape, but other methods for manufacture may be used. In the embodiment presented, a set of eight tabs 306 are used but another number of tabs 306 may be used to connect the tubes 302 and 304.

The inner tube forms an inner passage 308. The inner passage 308 is a volume enclosed within the inner tube 302 and is advantageously fluidly isolated from an outer passage 310 formed internally to the outer tube 304 and externally to the inner tube 302. In one embodiment, the heat exchanger 300 may be used as the air-to-air heat exchanger 211 shown in FIG. 2. The inner passage 308 may be used for routing of the tailpipe gas stream 223 traveling in a direction 312 denoted by the solid line arrows. The outer passage 310 may be used for routing of the EGR gas stream 221, advantageously insulating the tailpipe gas stream from the ambient environment to prevent heat loss. The EGR gas stream 221 travels in a direction 314 denoted by the dashed-line arrows, opposite of the direction 312 of travel for the after-treatment stream 223.

The directions 312 and 314 are advantageously opposite to promote more heat transfer between the two gas streams 221 and 223. Moreover, the tabs 306 that connect the tubes 302 and 304 also may be used as fins to promote the transfer of heat between the two streams 221 and 223, although additional fins may be added to the inner passage 308 and/or other fin configurations may be used in addition to or instead of the tabs 306. The tabs 306 are arranged along a plurality of radial directions with respect to a common center-point with the tubes 302 and 304. Fins, additional tubes, and other common heat exchanger design elements may be added to improve effectiveness of heat transfer.

Figure 5:
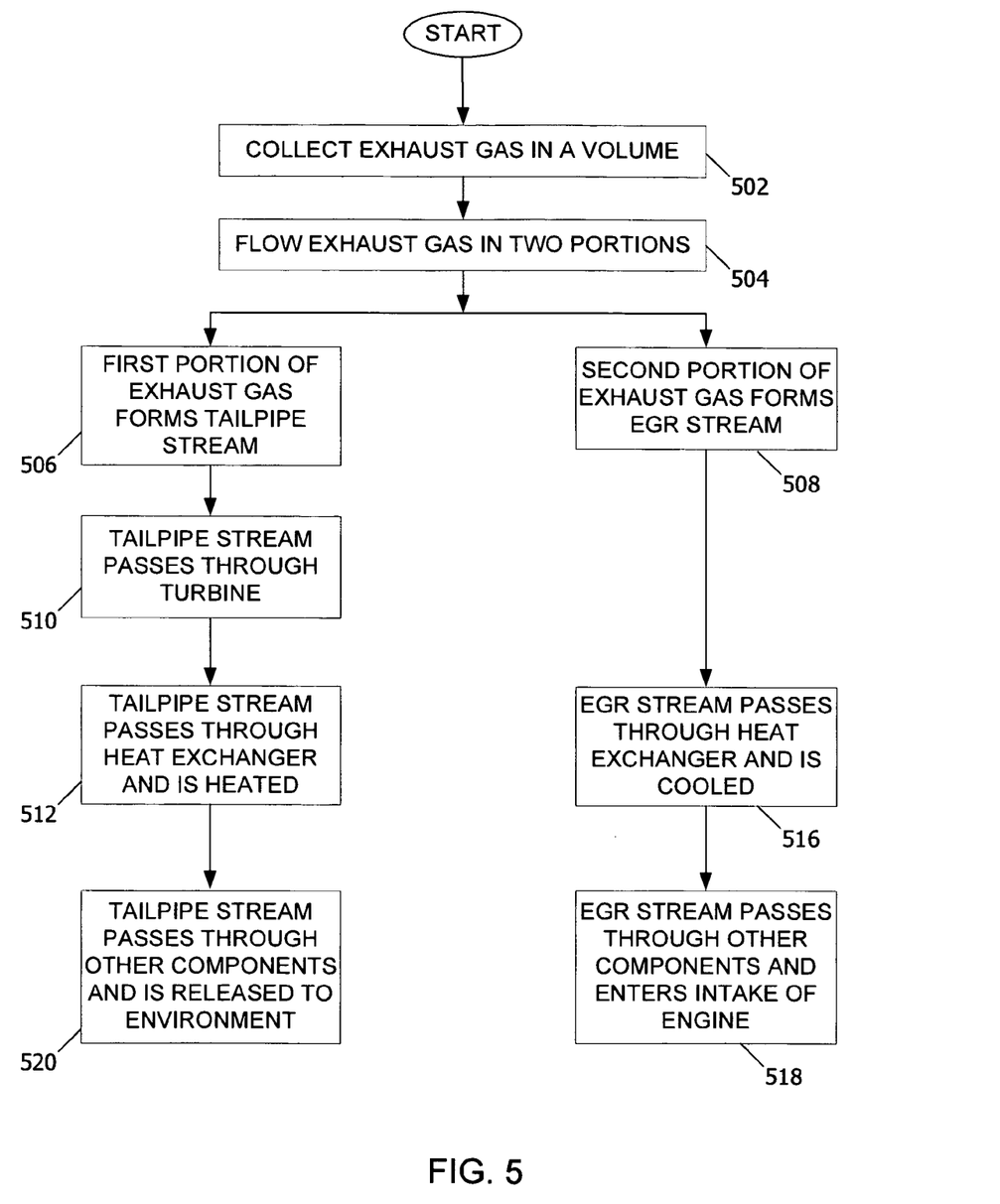
FIG. 5 is a flowchart for a method for effectively managing and recuperating heat in an internal combustion engine

A flowchart for a method for effectively managing and/or recuperating heat or thermal energy in an internal combustion engine is shown in FIG. 5. Exhaust gas is collected in a volume in step 502. Exhaust gas flows out of the volume in two portions in step 504. A first portion of exhaust gas from the volume flows out of the volume to form a tailpipe gas stream in step 506. A second portion of exhaust gas from the volume flows out of the volume to form an EGR gas stream in step 508. The tailpipe gas stream passes through at least one turbine in step 510. If additional turbines are present, the tailpipe gas stream may also pass through the additional turbines. An amount of heat is transferred from the EGR gas stream to the after-treatment stream in a heat exchanger. The tailpipe gas stream passes through the heat exchanger in step 512 where it is heated by receiving heat from the EGR gas stream.

The EGR gas stream passes through the heat exchanger in step 516 where it is cooled by giving up heat to the tailpipe gas stream. The EGR gas stream exits the heat exchanger and passes through other engine components, for example an EGR valve and/or an EGR cooler, before entering an intake manifold of an engine in step 518. The tailpipe gas stream exits the heat exchanger and passes through other engine and/or vehicle components, for example a DPF and/or an oxidation catalyst, before being released to the environment in step 520.

In one implementation of this invention, the heat exchanger 211 shown in FIG. 2 may be internally coated with a coating layer that is an oxidation material layer exposed to exhaust gas. The coating layer may advantageously be present in gas passages connecting ports 213 and 219. The coating layer may serve to catalyze recirculated exhaust gas, which is typically an exothermic reaction. Heat generated by the exothermic reaction may augment the heat transferred to the tailpipe gas stream 223. Suitable coating materials may be any materials used in the art, such as compounds that include platinum group metals, for example, the material described by Okuda et al. U.S. Pat. No. 6,193,942, published on Feb. 27, 2005, or the material described by Voss et al. in U.S. patent application Publication No. US 2003/0108465 A1, published on Jun. 12, 2003. The contents of both references mentioned above are incorporated herein in their entirety by reference.

Figures 6, 7, 8:
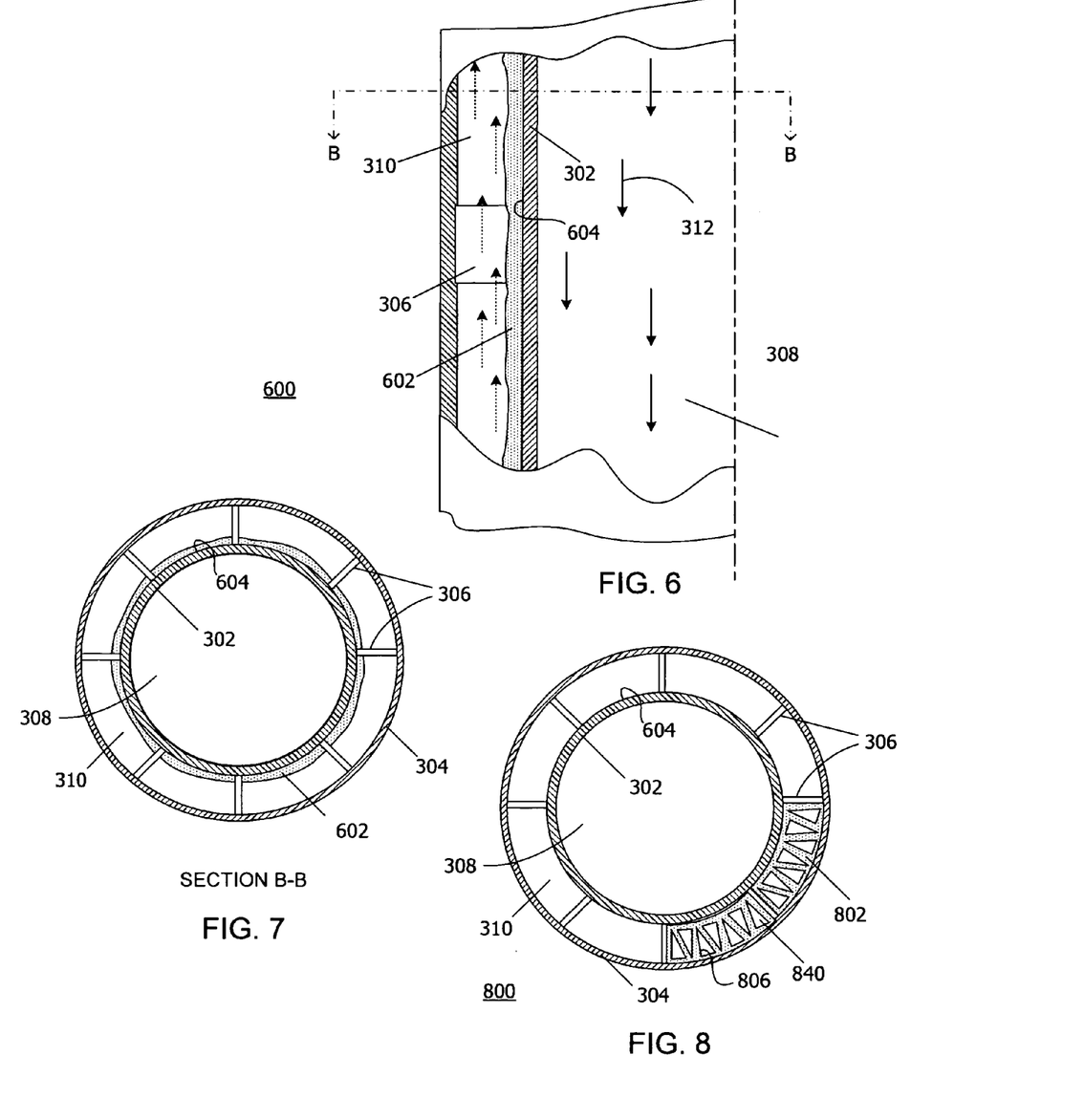
FIG. 6 is a perspective view of a section of an air-to-air heat exchanger that includes two concentric tubes in accordance with the invention
FIG. 7 is a section view of the air-to-air heat exchanger of FIG. 6.
FIG. 8 is a section view of an alternative embodiment for the air-to-air heat exchanger of FIG. 3 in accordance with the invention.

One advantageous implementation of a catalytic coating for the cooler 300 is shown in a segment 600 of the cooler 300, shown in FIG. 6. A coating layer 602 is deposited on an outer surface 604 of the inner tube 302. The coating layer 602 is an oxidation catalyst material layer that is exposed to exhaust gas present in the outer passage 310 carrying the EGR gas stream 221. An exothermic reaction between the coating layer 602 and constituents of the exhaust gas, such as HC and PM, in the outer passage 310 produces an additional amount of heat that is transferred through the inner tube 302 and into the exhaust gas present in the inner passage 308 during operation.

A cross-sectional view of the segment 600 is shown in FIG. 7. The outer surface 604 of the inner tube 302 is coated with the coating layer 602 along an entire periphery. The coating layer 602 may be interrupted locally by the tabs 306. The coating layer 602 may be deposited directly onto the outer surface 602 to provide an adequate interface surface with the exhaust gas in the stream 211, or may alternatively be deposited upon a substructure 800 as shown in FIG. 8. The substructure 800 includes a body structure 802 having a plurality of openings 840. The openings 840 may have any shape, and are advantageously shown as triangular. The body structure, or substrate, may be made of any type of heat resistant material, for example ceramic or steel, and may be extruded in sections, or fabricated of sheet metal. Sheet metal type substrates would be most advantageous because of their thermal conductivity properties, strength, and minimal flow resistance. The sections may be coated with a coating layer 806 before or after being inserted between the inner tube 302 and the outer tube 304. Each section may be straight and have any length suitable for easy insertion into the cooler 300. Alternatively, it may be advantageous for cost consideration to coat only a portion of the body structure with the oxidation catalyst.

Figure 9:
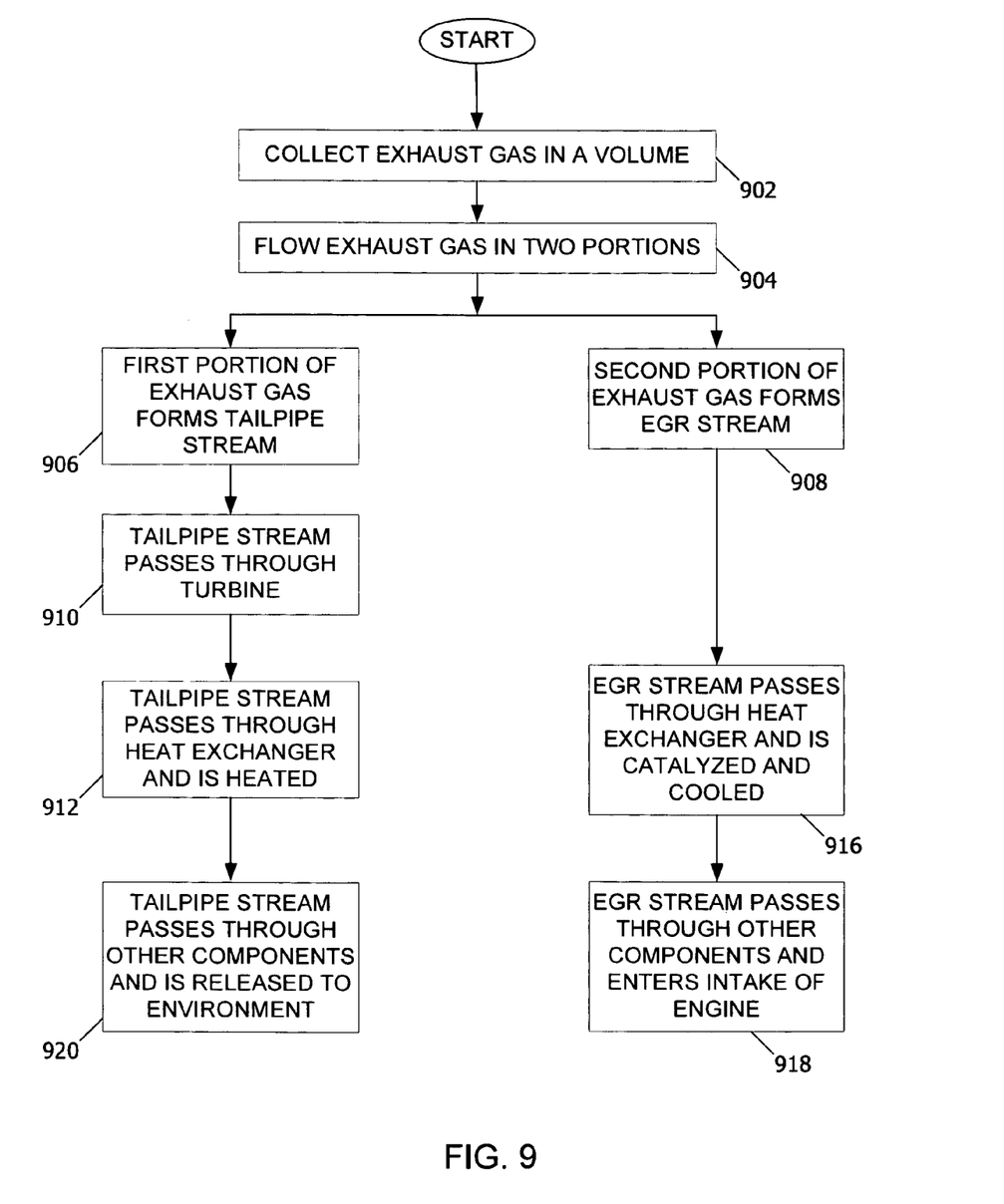
FIG. 9 is a flowchart for a method catalyzing exhaust gas in an internal combustion engine in accordance with the invention.

A flowchart for catalyzing exhaust gas in a heat exchanger and effectively managing and/or recuperating heat or thermal energy in an internal combustion engine is shown in FIG. 9. Exhaust gas is collected in a volume in step 902.

Exhaust gas flows out of the volume in two portions in step 904. A first portion of exhaust gas from the volume flows out of the volume to form a tailpipe gas stream in step 906. A second portion of exhaust gas from the volume flows out of the volume to form an EGR gas stream in step 908. The tailpipe gas stream passes through at least one turbine in step 910. If additional turbines are present, the tailpipe gas stream may also pass through the additional turbines. An amount of heat is transferred from the EGR gas stream to the tailpipe gas stream in a heat exchanger. The tailpipe gas stream passes through the heat exchanger in step 912 where it is heated by receiving heat from the EGR gas stream.

The EGR gas stream passes through the heat exchanger in step 916 where it is catalyzed by a catalytic coating that induces an exothermic reaction. Heat from the exothermic reaction and heat carried as enthalpy of the EGR gas stream is transferred to the tailpipe gas stream. The EGR gas stream exits the heat exchanger and passes through other engine components, for example an EGR valve and/or an EGR cooler, before entering an intake manifold of an engine in step 918. The tailpipe gas stream exits the heat exchanger and passes through other engine and/or vehicle components, for example a DPF and/or an oxidation catalyst, before being released to the environment in step 920.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for an internal combustion engine comprising the steps of:
   collecting exhaust gas in a volume;
   flowing exhaust gas out of the volume in a first and a second portions, wherein the first portion forms a tailpipe gas stream, and wherein the second portion forms an exhaust gas recirculation (EGR) gas stream;
   passing the tailpipe gas stream through a turbine;
   catalyzing the EGR gas stream with an oxidizer coating in a heat exchanger; and
   transferring thermal energy from the EGR gas stream to the tailpipe stream in the heat exchanger, wherein the EGR gas stream is cooled in the heat exchanger.

2. The method of claim 1, wherein the volume is an exhaust manifold of the internal combustion engine, and wherein the EGR gas stream flows from the exhaust manifold upstream of the turbine.

3. The method of claim 1, wherein the tailpipe gas stream is exhaust gas flowing from an outlet of the turbine.

4. The method of claim 1, wherein the heat exchanger is an air-to-air heat exchanger.

5. The method of claim 1, further comprising the step of passing the tailpipe gas stream through at least one after-treatment component.

6. The method of claim 1, wherein step of catalyzing is accomplished by contact between the EGR gas stream and a material layered onto an internal surface of the heat exchanger.

7. An apparatus comprising:
   an engine having an intake manifold and an exhaust manifold;
   a turbine in fluid communication with the exhaust manifold;
   a heat exchanger having a hot gas inlet, a cold gas inlet, a warm gas outlet, and a cooled gas outlet;
   an oxidation catalyst material layer disposed on an internal surface of the heat exchanger;
   wherein the hot gas inlet is in direct fluid communication with the exhaust manifold and the cooled gas outlet, wherein the cold gas inlet is in direct fluid communication with the turbine and the warm gas outlet; and
   wherein the internal surface of the heat exchanger is in fluid communication with the cooled gas outlet and the intake manifold.

8. The apparatus of claim 7, further comprising an exhaust gas recirculation valve in fluid communication with the cooled gas outlet.

9. The apparatus of claim 7, further comprising an exhaust gas recirculation cooler in fluid communication with the EGR valve.

10. The apparatus of claim 7, further comprising an after-treatment component in fluid communication with the warm gas outlet, wherein the at least one after-treatment component is a diesel particulate filter.

11. The apparatus of claim 7, wherein the heat exchanger is an air-to-air heat exchanger.

12. The apparatus of claim 11, wherein the air-to-air heat exchanger includes an inner tube and an outer tube, wherein the inner tube and the outer tube are concentric, and wherein the oxidation material layer is disposed on the inner tube.

13. The apparatus of claim 12, further comprising at least one section of a substructure having a structure and a plurality of openings, wherein the substructure is disposed between the inner tube and the outer tube, and wherein the oxidation material layer is disposed on the substructure.

14. An air-to-air heat exchanger, comprising:
    an inner tube;
    an outer tube disposed around the inner tube, wherein the inner tube and the outer tube are concentric;
    a plurality of tabs connected between the inner tube and the outer tube; and
    an oxidation material layer disposed between the inner tube and the outer tube;
    wherein a first gas stream flows in a first direction in an inner volume of the inner tube, and wherein a second gas stream flows in a second direction in a volume formed between the inner tube and the outer tube.

15. The air-to-air heat exchanger of claim 14, wherein the inner tube and the outer tube are thin walled steel tubes.

16. The air-to-air heat exchanger of claim 14, wherein the inner tube and the outer tube follow a common path.

17. The air-to-air heat exchanger of claim 14, wherein the plurality of tabs consists of tabs that are arranged along a plurality of radial directions with respect to a common center-point to form a plurality of sections.

18. The air-to-air heat exchanger of claim 17, further comprising a substructure disposed in at least one of the plurality of sections, wherein the substructure includes a structure having a plurality of openings, and wherein the oxidation catalyst material layer is disposed on the substructure.

19. The air-to-air heat exchanger of claim 14, wherein the oxidation catalyst material layer is coated onto an outer surface of the inner tube.

20. The air-to-air heat exchanger of claim 19, wherein the oxidation catalyst material layer extends along an entire periphery of the outer surface.

* * * * *